M. BOHNE.
INFLATING PUMP FOR MOTOR VEHICLE TIRES.
APPLICATION FILED NOV. 28, 1908.
946,101.
Patented Jan. 11, 1910.
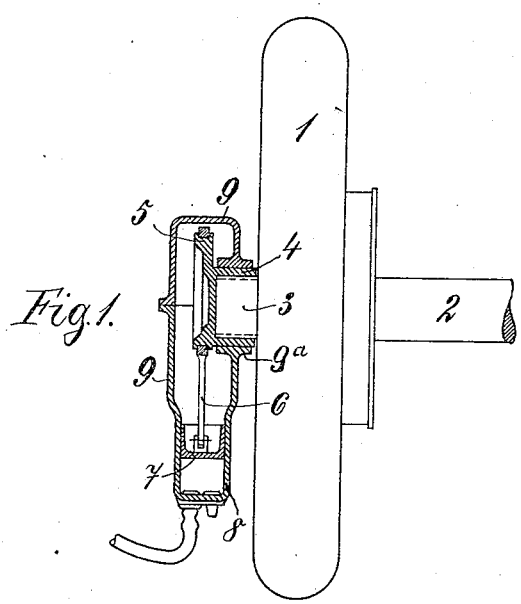
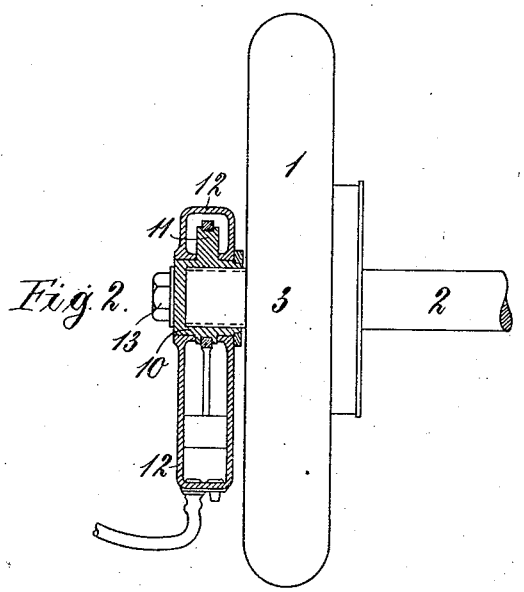
Witnesses:
Flora Greenwald.
Jacob L. Diamond.
Inventor:
Max Bohne
by L. H. Böhm,
Attorney

UNITED STATES PATENT OFFICE.

MAX BOHNE, OF BERLIN, GERMANY.

INFLATING-PUMP FOR MOTOR-VEHICLE TIRES.

946,101.  Specification of Letters Patent.  Patented Jan. 11, 1910.

Application filed November 29, 1908. Serial No. 464,919.

*To all whom it may concern:*

Be it known that I, MAX BOHNE, a subject of the King of Prussia, German Emperor, and resident of 37 Oranienstrasse, Berlin, Germany, have invented certain new and useful Improvements in Inflating-Pumps for Motor-Vehicle Tires, of which the following is a specification.

The present invention relates to the means used for inflating the tires of motor vehicles.

It has been proposed to provide the motor with a pump mounted in some suitable place on the frame of the motor and driven from the motor for the purpose of inflating the tire. When such arrangements are not in the first instance built in with the motor their addition involves inconveniences on account of the exhaustive utilization of all space in such cases and further such means did not tend to enhance the beauty of the car, tricar or the like to which they were added.

The object of the present invention is to provide a form of driving mechanism which shall avoid these difficulties.

To this end the invention consists in providing a detachable inflating pump driven from a driven road wheel in any convenient way through mechanism forming no permanent part of the vehicle structure and adapted to be brought into operation when the motor vehicle is at a stand-still and the road wheel of said driving axle is raised from the ground.

Referring to the accompanying drawings which show two convenient methods of employing a detachable pump to a motor vehicle. Figure 1 shows a section through the pump and driving mechanism attached to the projecting part of the wheel shaft which is usually occupied by the dust cap, Fig. 2 shows a modified form in which the arrangement is more compact and more easily applied to the wheel driving shaft.

The wheel 1 which may be either a front or a rear wheel is driven by a shaft 2 and the shaft 2 is provided with a projecting part 3 on which the dust cap is usually screwed. When it is desired to use the pump this dust cap is removed and in place thereof a screwed sleeve 4 is inserted on the shaft projection 3. This sleeve 4 is provided with an eccentric or crank 5 connected by a rod 6 to a pump piston 7 which reciprocates in a cylinder 8. The cylinder 8 is formed in one with a casing 9 provided with a boss 9ª in which the sleeve 4 is rotatable. The pump cylinder 8 is of course provided with suitable valves as indicated. When it is desired to insert this form of pump in place the whole casing 9 must be rotated together with the sleeve so as to screw the said sleeve onto the projection 3. This of course does not involve any difficulty or special mechanical knowledge on the part of the person employing the pump. When it is desired to use the pump the motor vehicle is brought to a stand still and the driven axle and road wheel to which the coupling sleeve 4 is applied is raised from the ground. The motor is then started and the inflating pump connected up to the tires which it is desired to inflate. A more convenient form, however, is illustrated in Fig. 2 in which a sleeve 10 is provided in its central portion with an eccentric 11 by which the pump 12 is operated. The casing of the pump 12 is provided with bosses which surround the sleeve 10 on each side of the eccentric 11 and the exterior of the sleeve 10 is provided with a hexagonal or like head 13 by which the sleeve 10 may be readily screwed into place on the shaft projection 3.

In both the arrangements described the direction of rotation of the shaft 3 is of course such that the screw on the projection 3 tightens in the sleeve during driving. Further during working of the pump the casing of the same may be held in any convenient way.

I claim:—

1. In combination with the axle of a driving wheel of a motor car and the like having a projecting portion on one side, a detachable coupling having a sleeve thereon engaging said projecting portion, a boss permitting the sleeve of said coupling to rotate therein, a casing associated with said boss which casing acts as the cylinder of a pump, a piston in said cylinder and means for transmitting motion from said detachable coupling to the pump.

2. In combination with the axle of a driving wheel of a motor car having a projecting portion on one side, a detachable inflating pump comprising a casing acting as the cylinder, a sleeve rotatably mounted in said casing and adapted to be screwed on the projecting portion of the axle, a piston in said cylinder and means for transmitting motion to said piston.

In witness whereof I have hereunto set my hand in the presence of two witnesses.

MAX BOHNE.

Witnesses:
 HENRY HASPER,
 WOLDEMAR HAUPT.